United States Patent
Xiao et al.

(10) Patent No.: US 10,380,090 B1
(45) Date of Patent: Aug. 13, 2019

(54) NESTED OBJECT SERIALIZATION AND DESERIALIZATION

(71) Applicant: Amazon Technologies, Inc., Seattle, WA (US)

(72) Inventors: Wei Xiao, Bellevue, WA (US); Usman Ahmed Shami, Sammamish, WA (US); Fahad Ahmed, Santa Clara, CA (US); Andrew Desmond Budiman, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 434 days.

(21) Appl. No.: 14/852,295

(22) Filed: Sep. 11, 2015

(51) Int. Cl.
*G06F 17/30* (2006.01)
*G06F 16/22* (2019.01)
*G06F 16/28* (2019.01)

(52) U.S. Cl.
CPC ........ *G06F 16/2246* (2019.01); *G06F 16/282* (2019.01)

(58) Field of Classification Search
CPC ...................................................... G06F 17/30
See application file for complete search history.

(56) References Cited

U.S. PATENT DOCUMENTS

| | | | |
|---|---|---|---|
| 2014/0047040 A1* | 2/2014 | Patiejunas | H04L 51/24 709/206 |
| 2014/0280373 A1* | 9/2014 | Raitto | G06F 17/30292 707/803 |
| 2015/0134670 A1* | 5/2015 | Liu | G06F 17/30327 707/741 |
| 2015/0293962 A1* | 10/2015 | van Oortmerssen | G06F 17/30345 707/756 |
| 2015/0302037 A1* | 10/2015 | Jackson | G06F 17/30893 707/736 |
| 2016/0321375 A1* | 11/2016 | Liu | G06F 17/30911 |

* cited by examiner

*Primary Examiner* — Hung Q Pham
(74) *Attorney, Agent, or Firm* — Davis Wright Tremaine LLP

(57) ABSTRACT

A database may store an object comprising a hierarchy of sub-objects. Numeric identifiers may be assigned to names of the sub-objects and used in place of the names when writing the object to storage. Scalar values may be prefixed with length indicators. Collections may be prefixed with counts indicative of the number of elements in the corresponding collection. A portion of the object may be retrieved from storage by traversing a path from the root of the hierarchy to the desired portion. Length and count information may be used to skip over portions of the object during the traversal.

20 Claims, 10 Drawing Sheets

NESTED OBJECT SERIALIZATION AND DESERIALIZATION

BACKGROUND

Databases may sometimes be configured to store nested objects within a single field. A database might, for example, be configured to store a binary file or a document as a single field within a row of data. The storage and retrieval operations typically used for other types of fields may be unwieldy when applied to nested objects. Typically, a database stores or retrieves fields in their entirety. Retrieving the entirety of a nested object, however, may be inefficient, particularly when only a subset of the document is to be retrieved.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
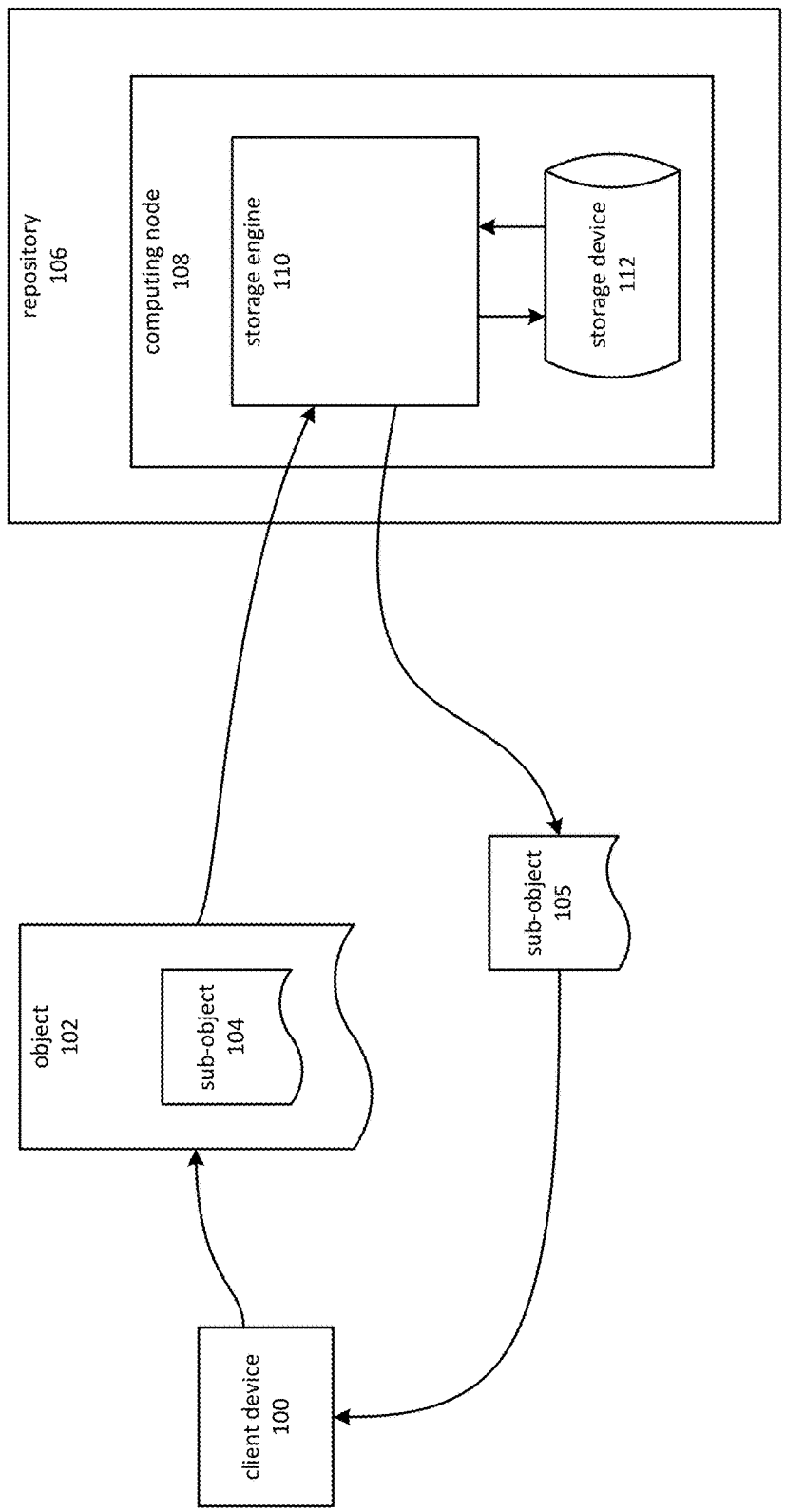
FIG. 1 is a block diagram depicting an example of a system configured as a repository for nested objects.

Disclosed herein are systems, methods, and computer program products for storing and retrieving nested objects. An example of a nested object is a JavaScript Object Notation ("JSON") object. Nested objects may sometimes be referred to as structured or semi-structured objects, because they typically possess a loose structure, or hierarchy, of internal objects.

A nested object may, in some cases, be large and complex as compared to other types of objects. For example, a nested object might represent the complete text of a book, and might contain sub-objects representing sections, chapters, and pages of the book. There may be cases where only a portion of the nested object is to be accessed, such as when a single page of the book is to be displayed or when the first chapter of the book is to be loaded into memory.

A storage technique for nested objects may, as described herein, be oriented to reducing storage size by applying lossless compression to a portion of the nested document while at the same time providing mechanisms for retrieving portions of a nested object. Moreover, as described herein, a storage technique for nested objects may involve reducing the number of passes over an object that are needed to store the nested object on a storage device. For example, it may be the case in some embodiments that a single pass over the object is needed, or in some cases no more than two passes are needed.

In an example, a nested object may comprise scalar values and collections of values, such as a list or array. A distributed, key-value database management system might receive a request to store the nested object.

In response to the request, a storage engine of the database management system may initiate a scan of the nested object that may proceed while the nested object is being converted to an on-disk format and written to a storage device, such as a mechanical disk drive or a solid-state drive. The scan of the nested object may, in some cases, proceed in synchrony with the process of writing the on-disk version of the nested object to the storage device.

While the object is being scanned, a map may be formed to associate numeric identifiers with names used in the nested object. The names may be strings or other alphanumeric sequences used to identify portions of the nested object. For example, a nested object may be viewed as a hierarchy of sub-objects, each of which might be associated with a name. Alternatively, a nested object may be viewed as a collection of name-value pairs, in which the values (i.e. sub-objects) may themselves contain additional collections of name-value pairs.

A numeric identifier may be generated and used to uniquely identify each string. This is sometimes referred to as atomization. The storage engine, while scanning the object, may associate a unique numeric identifier with each name used in the nested object. In the on-disk format, the numeric identifier may be stored in place of the name. The storage engine may store the association in a map, which may (for example) be stored in a header of the nested object's on-disk representation, or in a separate location. Note that this technique achieves lossless compression of the nested object, but does not, in contrast with many compression techniques, require an additional pass over the data. However, in some instances, a two-pass approach may be employed in which the map is constructed during a first pass and the object is written to storage during the second pass.

Scalar values may be described as data of a known size, where size refers to the number of bytes needed to store the data. As the storage engine forms the on-disk representation of the object, it may prefix scalar values with an indication of the size of the scalar value. Although the use of a size indicator may, in some cases, be redundant because the size of a scalar value is known and may be derived from its type, in the embodiments disclosed herein the prefixed size information may be used to increase retrieval efficiency.

The storage engine may prefix data for object collections, such as arrays, maps, lists, and sets, with a count indicator instead of or in addition to a size indicator. In the case of an object collection, the size of the collection in bytes may not be knowable until the on-disk representation of the collection has been formed. Because this may require an additional scan of the nested object, the size information may be omitted in some cases. Instead, the count indicator is written to provide information describing how many elements the collection contains. This allows the storage engine, when retrieving the sub-object, to skip over the collection by skipping over its individual elements and using the count to determine when the boundary of the collection has been reached. In other cases, the size information may be included and both the size and count may be maintained. In some cases, calculation of the size information may require a second pass, while in others the size may be calculated in a single pass. The size calculation may include keeping a running total of the memory space occupied by the individual elements of the collection and any header fields or other information that might be included in the array.

A portion of a nested object may be retrieved from a storage device by following a path through the hierarchy of nested objects. The object may be read from the storage device in a single scan, in which the atomized identifiers are used to identify sub-objects on the path and the size and count information is used to skip over portions of the nested object. Once the object has been traversed to the end of the path, the relevant portion of the object may be read from the storage device.

FIG. 1 is a block diagram depicting an example of a system configured as a repository for nested objects. A repository 106 may be operated on a computing node 108. The repository 106 may maintain collections of data by supporting operations to store and retrieve data items. Examples of a repository include database systems such as relational and non-relational databases. In some instances, for example, the repository 106 may include the computing node 108 configured as a key-value database system. In a key-value database system, a value may be indexed in the repository 106 using a corresponding key value. The value may therefore be stored and retrieved using the key value. Note that in many cases, a key may correspond to a collection of values, rather than a single value.

Although FIG. 1 depicts only a single computing node, in some cases the repository 106 may comprise computing nodes in addition to computing node 108. For example, a collection of data may be partitioned between computing node 108 and one or more additional computing nodes. The various systems, methods, computer program products, techniques and mechanisms described herein may be applied to repositories of data implemented on multiple computing nodes.

The computing node 108 may comprise a storage engine 110. The storage engine 108 coordinates storing and retrieving data items from the storage device 112. The storage engine 108 may also perform aspects of query processing. A query may specify instructions for storing, retrieving, or modifying data items stored on the storage device 112. Aspects of query processing may include performing operations on the contents of objects stored in the repository 106. For example, an object $O_1$ might be stored in the repository 106, on the storage device 112, using a key value $K_1$ to represent the object $O_1$ in an index. A query might be performed on the object $O_1$ in which a portion of $O_1$ is examined.

In the example of FIG. 1, the object $O_1$ is stored on the storage device 112 in response to object 102 being inserted, at the direction of client device 100, into the repository 106. The object 102 may consist of a hierarchy of sub-objects, including the depicted sub-object 104. Examples of sub-objects include single values, tuples, and nested sub-objects. The values associated with sub-objects may be various types, such as scalar values, maps, lists, arrays, strings, and so forth. Examples of scalar values include integers, floating point numbers, and so forth. In some cases, scalar values may be alphanumeric values or strings. Typically, scalar values are represented by a fixed-length sequence of bytes. A scalar value may be distinguished from more complex types such as maps, lists, and arrays. Maps, lists, and arrays generally contain one or more scalar values, but are not scalar values themselves.

The client device 100 may issue commands to store object 102 in the repository 106. Subsequently, the client device 100 may issue commands to retrieve all or part of the object 102. For example, the client device 100 might issue a command to retrieve only sub-object 104. In some cases, a transformation operation might be performed on the portion of the object 102 that is to be retrieved. In FIG. 1, the returned object is depicted as sub-object 105, which represents some version of the sub-object 104 that was stored, within object 102, in the repository 106. In these and other cases, efficiency may be increased by minimizing the amount of data that needs to be read from storage device 112. For example, if sub-object 104 is to be retrieved, the amount of data read from storage device 112 might, under ideal conditions, be only the data corresponding to the sub-object 104.

Figure 2:
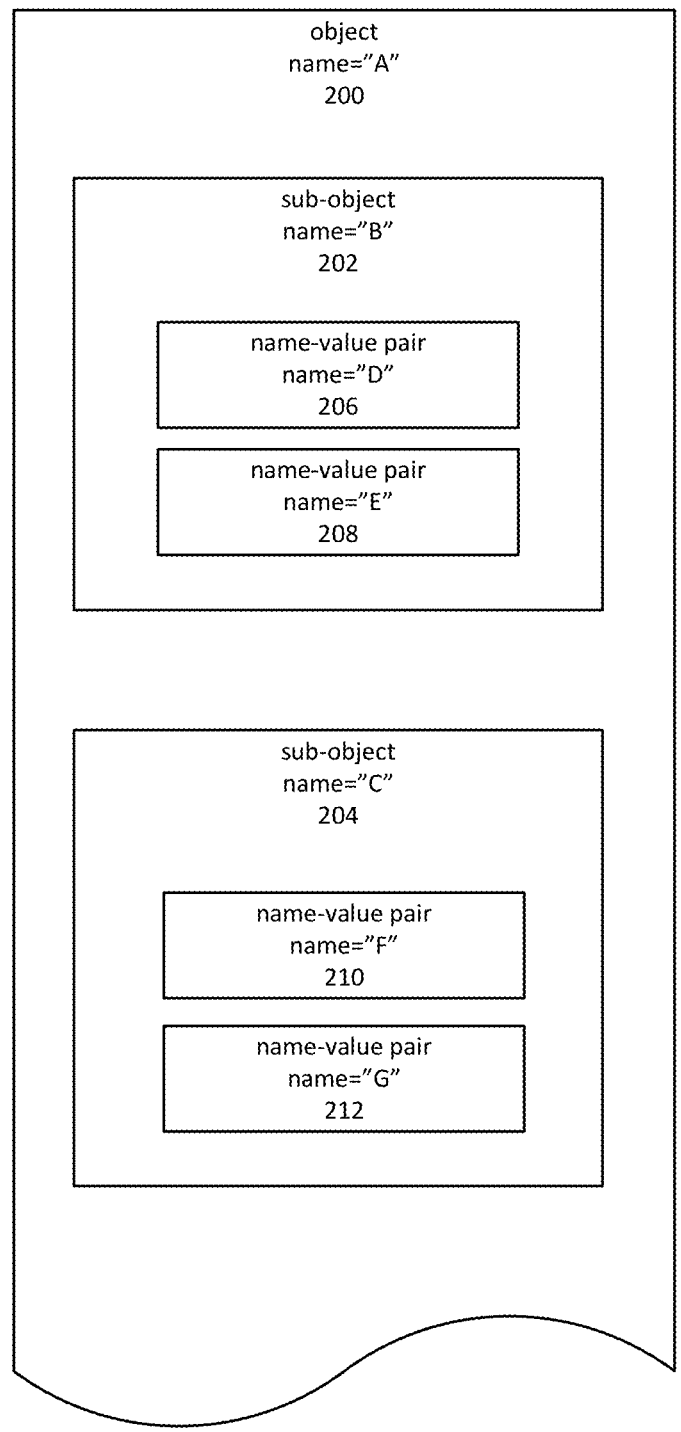
FIG. 2 is a block diagram depicting an example of a nested object.

FIG. 2 is a block diagram depicting an example of a nested object. Other examples might include arrays, lists, or other structures. Some of these structures may be "flat" hierarchies, such as an array or a list of simple objects, sometimes referred to as values, such as strings, integers, or floating point numbers. An array, list, or other structure may, however, contain a number of nested sub-objects.

In the example of FIG. 2, an object 200 may consist of a hierarchy of objects, which may be referred to as sub-objects. By way of example, FIG. 2 depicts sub-objects 202 and 204 as children in an object hierarchy that has a parent object 200 as a root. Each object may include additional data in a variety of forms, one example of which is the name-value pairs depicted in FIG. 2 as name-value pairs 206-212. A name-value pair may be described as a sub-object comprising two sub-objects: a name sub-object and a value sub-object. Although not required, there may be names associated with any of the sub-objects in the hierarchy. For example, object 200 might have a name of "A," sub-object 202 might have a name of "B," and so on.

The object 200, sub-objects 202 and 204, and name-value pairs 206-212 may be associated with names, which may serve as identifiers for the corresponding values or sub-objects. The names of the sub-objects may be concatenated or otherwise joined to express a path identifier, which may be used to locate a particular sub-object or a region of the hierarchy of sub-objects having the identified object as its root.

The structure of the object 200 that is depicted in FIG. 2 is also indicative of an on-disk format for the object 200. A nested structure may be employed, in which the on-disk representation of a parent object includes all of its children. For example, a sub-object 202 might occupy a contiguous region of storage space on a storage device. The contiguous region may contain, for example, data for the name-value pairs 206 and 208. An adjoining region in memory might then completely contain the next sub-object 204.

Figure 3:
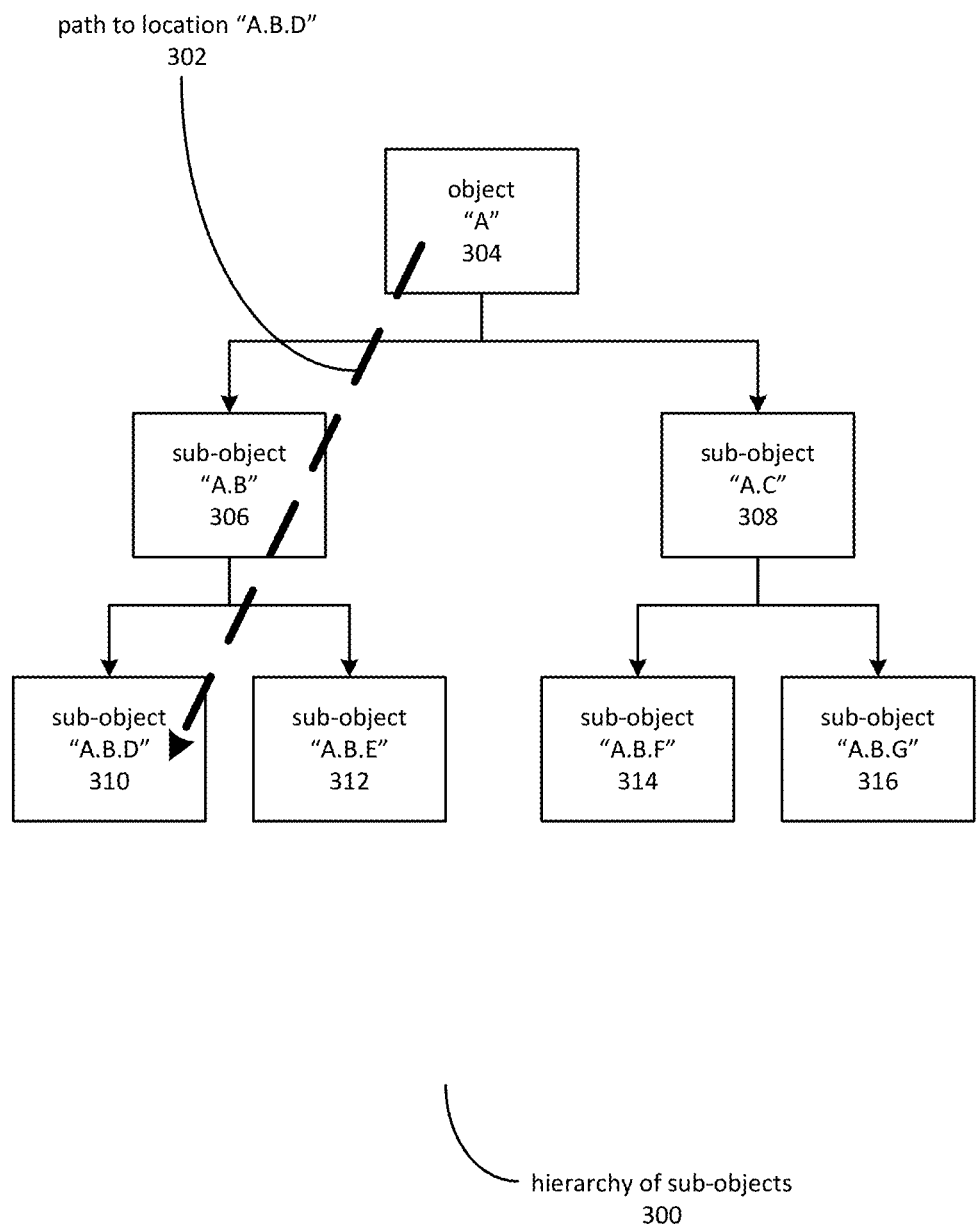
FIG. 3 is a block diagram depicting loading a sub-object by traversing a path through a nested object.

FIG. 3 is a block diagram depicting loading a sub-object by traversing a path through a hierarchy of sub-objects 300. In various instances, a sub-object 310 of the hierarchy of sub-objects 300 may be loaded by traversing a path 302 to the location of the sub-object 310.

A location in the hierarchy of sub-object 300 may be identified by a path. For example, in FIG. 3 the location of a sub-object 310 might be identified by the path "A.B.D," which may refer to the names of the sub-objects 304, 306, and 310. If the path to the sub-object 310 is known, in various instances the contents of the sub-object 310 may be read by reading portions of objects along the path 302 from the root object 304 to the intended sub-object 310. This may comprise reading a portion of object 304, skipping over any intervening objects to sub-object 306, skipping over any intervening objects, and then reading the sub-object 310. Note that this reflects a nested storage structure, consistent with the various aspects and embodiments disclosed herein.

The traversal depicted in FIG. 3 may be performed using an on-disk structure in which each sub-object occupies a contiguous region of memory, including all of the sub-objects child objects. The traversal may further utilize the encoding depicted in FIG. 4, which is a block diagram depicting an encoding of a scalar value field.

Scalar values are generally fixed-length fields. For example, an integer is typically four bytes long, while a long integer is eight bytes, and so forth. Accordingly, an encoding of a scalar value field that includes an explicit field for length information contains redundant data. However, embodiments may nevertheless include a length field in scalar value encodings in order to facilitate efficient retrieval of portions of a nested object.

Figure 4:
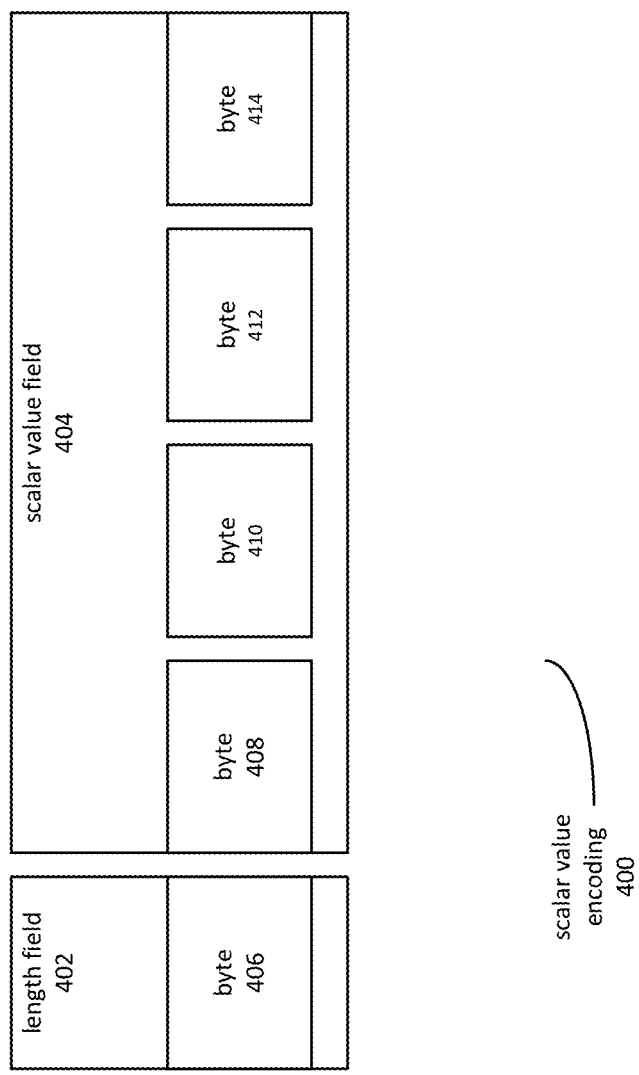
FIG. 4 is a block diagram depicting an encoding of a scalar value field.

FIG. 4 depicts a scalar value encoding 400 comprising a length field 402 and a scalar value field 404. As shown, the length field 402 occupies a first byte 406 and the scalar value field 404 occupies four subsequent bytes 408-414. As depicted in FIG. 4, the bytes 406-414 are contiguous. The bytes 406-414 correspond to a continuous range of memory address. The length field 402 is located at a lower portion of memory than the scalar value field 404, and may therefore be said to prefix the scalar value field 404. Note that in some cases, additional fields may be interposed between the length field 402 and the scalar value field 404. However, even in such cases the length field 402 should precede the scalar value field 404 in memory.

In the example of FIG. 4, the scalar value field 404 occupies four bytes. For example, the scalar value field 404 might correspond to a four byte integer value. The length field 402, or more precisely the byte 406 used to store the length field, could contain the value four, corresponding to the four bytes 408-414 used to store the scalar value field.

In FIG. 4, the length field is depicted as occupying a single byte 406. This would, accordingly, restrict the number of possible bytes in the scalar value field to no more than 256 bytes, assuming that all eight bits of the byte are used to represent the length. In some instances, the length field may itself be expressed as a variable number of bytes. In one instance, a length field may be one, two, or three bytes long. The first byte of the length field may have bits reserved to indicate how many bytes the length field occupies. The two or three byte length formats might be used, for example, with string values, high-precision floating point numbers, and so forth.

Figure 5:
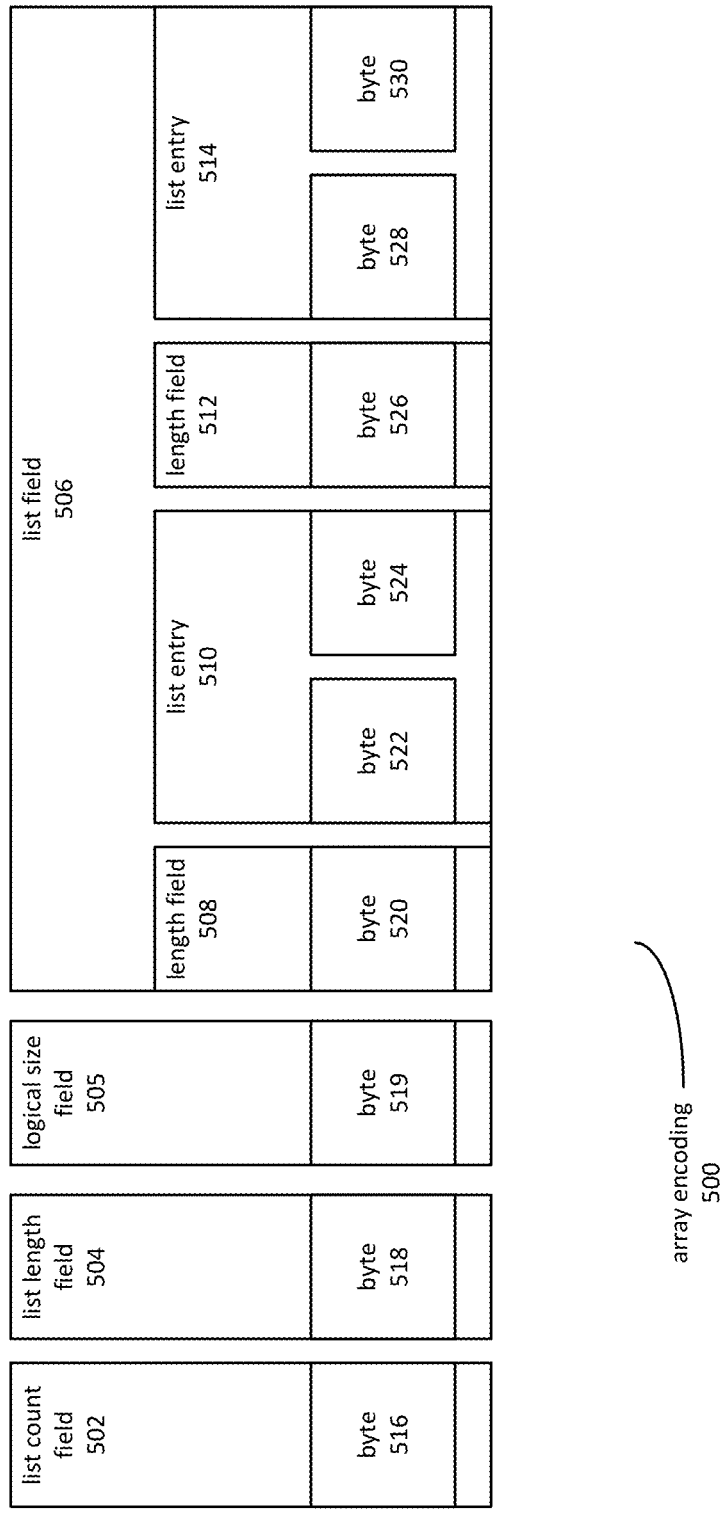
FIG. 5 is a block diagram depicting an encoding of a list.

Arrays, sets, maps, lists, and other data collections may also be encoded in a nested object. FIG. 5 is a block diagram depicting an encoding of a list. Note, however, that the techniques illustrated by FIG. 5 and described herein may be applied to a number of different types of collections, such as sets, maps, arrays, and so on.

An array encoding 500 may comprise an list field 506 prefixed by a list count field 502 and, in some instances, an list length field 504. The list count field 502 refers to the number of entries in the list, rather than to the length of the list in bytes. The list length field 504, if included, may refer to the number of bytes occupied by the list. Unless otherwise noted, or apparent from context and usage, the term "count" as used herein refers to a number of elements, and the term "length" refers to the number of bytes used to represent a value or structure.

The list count field 502 is depicted in FIG. 5 as occupying byte 516, and list length field 504 is depicted as occupying bytes 518. These fields come before the bytes 520-530, and may therefore be said to prefix the bytes 520-530 used to store the list field 506. A logical size field 505, occupying another byte 519, may also be included. In some instances the order of the list count field 502, the list length field 504, and the logical size field 505 may be rearranged. In some instances, only the list count field 502 may be included.

The logical size field 505, if present, may indicate the logical size of the list. The logical size of an object may refer to the size of the object as it was received from a client device. The logical size may be distinct from the storage size of the object. In some cases, the logical size may be a value that refers to an amount of input/output "cost" that will be attributed to an account associated with the client device when the list is accessed. The cost may include the size of the list as it was received from the client device, and may also include or be scaled by other factors. In some instances, each list or other object may be stored with a logical size indication. This approach may enable assessment of the input/output charge that may be associated with accessing (e.g., storing or retrieving) a sub-object for the client device separately from the object that contains the sub-object. In some instances, a value indicative of the size of the object as it is received may be determined. The value may be determined based on the physical size (e.g., number of bytes) of the object that is received. For example, in some cases an object might be transmitted to a provider in a file or a variable-length field. In these cases, a logical size of the file may be determined based on the number of bytes used by the file or variable-length field. A second value indicative of the cost of accessing the object may then be derived from the logical size. This may be done, for example, by multiplying the logical size by a conversion factor. For example, a provider might charge $0.01 for every megabyte of logical size.

The list field 506 may consist of a number of list entries 510 and 514. The list entry 510 may be prefixed by the length field 508, and the list entry 514 may be prefixed by the length field 512. The list field 506 that is depicted in FIG. 5 is an example of a list field containing scalar numbers, each of which is prefixed by a length field. Note, however, that the list might contain entries with non-scalar types, such as maps or arrays. A list might therefore comprise various types of sub-objects, including both scalar values and complex types. When containing complex objects such as a sub-list or sub-array, the arrangement of data in the list might be altered accordingly. For example, if list entry 510 were itself a list, then instead of being prefixed with the length field 508, it could be prefixed with a count field.

The list count field 502 may be used, in various instances, when the list field 506 is read from a storage device. Reading the list field 506 from the storage device may involve sequentially reading the list entries 510 and 514 until the value specified by the list count field 502 is reached. In the example of FIG. 5, this would be after the two list entries 510 and 514 are read. Each of the list entries may be read using length information, e.g., length fields 508 and 512. If a list entry is a list, map, or other collection, a count field might be used instead.

The list encoding 500 may include a list length field 504 indicating the size of the list field 506. In some instances, this field may be excluded in order to avoid making an additional pass over the data during the write operation. This is because the on-disk size of certain elements of an object may not be known until those elements have been written to their on-disk format. If the list length field 504 is present, it may facilitate skipping past the list field 506 if some subsequent object is to be read from disk.

Storage efficiency for nested objects may be increased by replacing some strings with numeric identifiers when storing an object. For example, referring to FIG. 2, the name "A" of object 200 might be represented on disk by the number "1," while sub-objects 202 and 204 might have their names represented by "2" and "3" rather than "B" and "C." This may increase storage efficiency when a name tends to recur in the object and when the name is larger than the number used to represent the name in the on-disk format. However, the frequency with which certain names recur in the data may not be knowable without taking a preparatory pass through the data to count recurrence. On the other hand, certain fields, such as the names used in nested objects, may tend to have relatively high recurrence and it may therefore be advantageous to compress them. In some instances, aspects of the compression—such as dictionaries and entropy information—may be reused across different objects.

Figure 6:
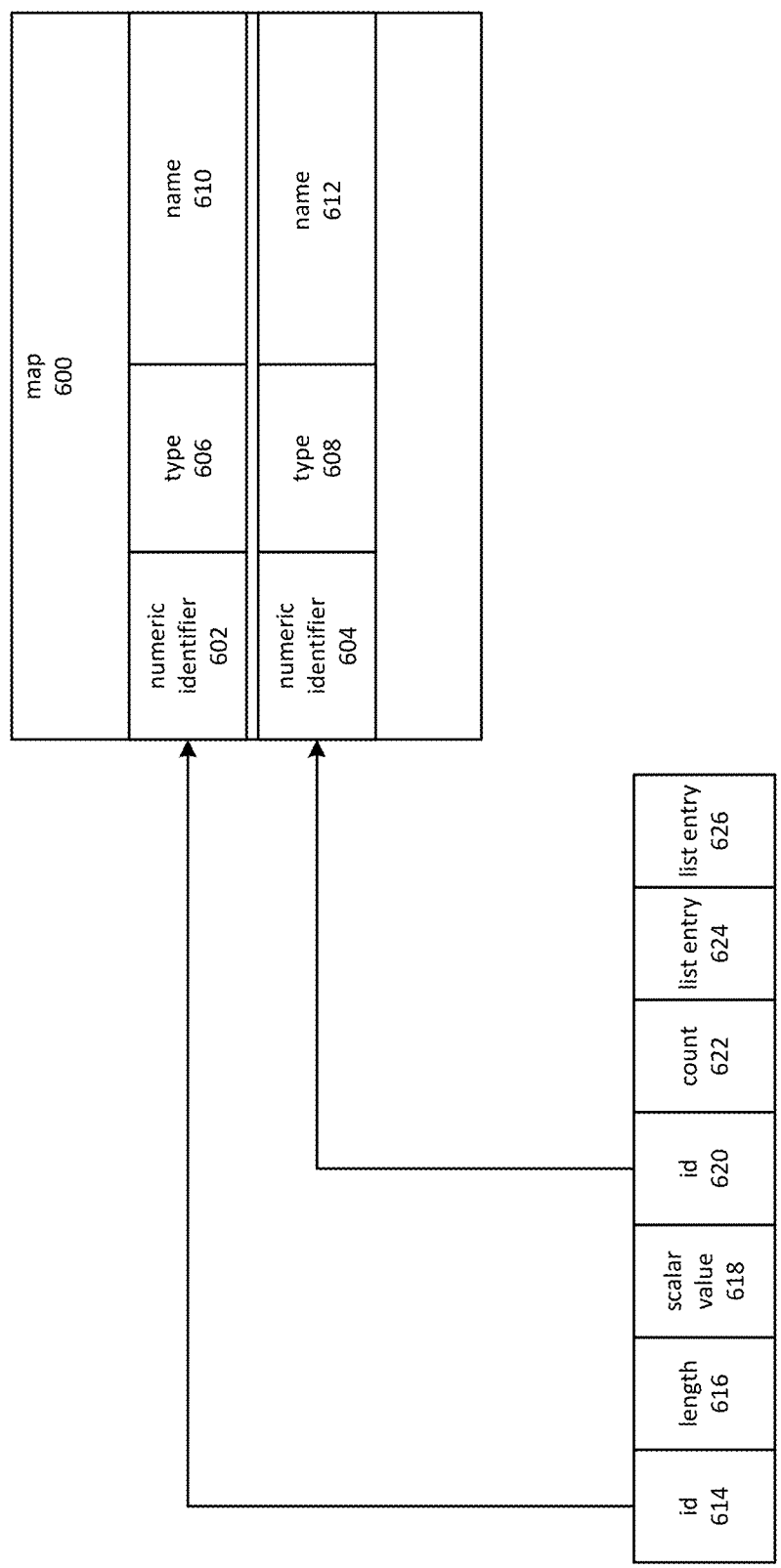
FIG. 6 is a block diagram depicting mappings between numeric identifiers and names.

FIG. 6 is a block diagram depicting mappings between numeric identifiers and names. In some instances, while writing an object to disk the storage engine may atomize the names used as identifiers of sub-objects and in name-value pairs. The atomization may include assigning a unique number to represent each string.

A map 600 may be formed as the object is written to a storage device or memory. The map may be written to the storage device so as to include data structures linking numeric identifiers to names and, in some cases, to other information, such as type information. The data written to the storage device may, for example, be a serialized list or hash table structure. The formation of the map 600 may also comprise selecting the identifier to be unique with respect to other identifiers used in the map 600.

The map 600 may be stored in space reserved for it in a header of the on-disk format, or appended to the end. The map 600 may be structured to enable a finite number of names to atomized. This approach may allow for the map 600 to be of fixed size, so that space may be reserved for it.

In some cases, rather than a global map 600 that applies to an entire object, a series of nested maps may be employed. In other words, the root-level objects in a hierarchy may have a map associated with it, as may one or more sub-objects. Not all objects may be stored with a map.

The map 600 may comprise entries associated names with identifiers. For example, as depicted in FIG. 6 a row in map 600 might comprise a numeric identifier 602, a type 606, and a name 610. The numeric identifier 602 may correspond to an id 614 written to storage along with a length field 616 and a scalar value field 618. The type field 606 may identify the value corresponding to id 614, length 616, and scalar value 618 as, for example, an integer or other scalar value. The name field 610 may represent the name associated with the value.

Similarly, a second entry in the map 600 may comprise an identifier 604, a type 608, and a name 612. The identifier 604 may correspond to an id 620 located in storage with a count field 622 and list entries 624-626. The type field 608 may indicate that the id is an identifier of a list. The name 612 may be the name associated with the list.

Figure 7:
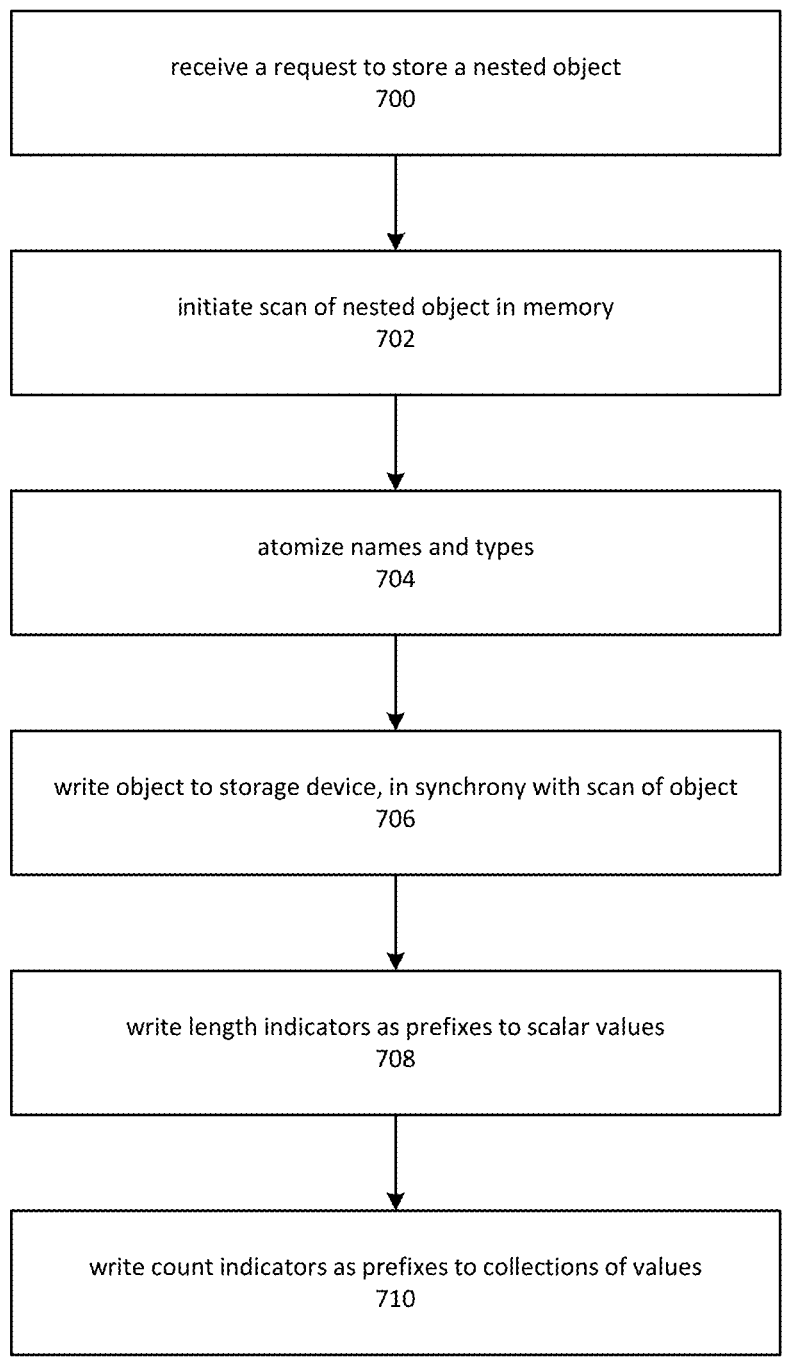
FIG. 7 is a flow diagram depicting serialization of a nested object.

FIG. 7 is a flow diagram depicting serialization of a nested object. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts receiving a request to store a nested object. The nested object may be described as containing a hierarchy of sub-objects, including scalar values and complex types such as arrays, lists, maps, sets, and so forth. Some of the sub-objects in the hierarchy may be associated with names. A path through the hierarchy may be represented by a concatenated sequence of these names.

As depicted by block 702, a scan of the object may be initiated. The scan may be in response to receiving the request to store the nested object. A scan may comprise accessing the elements of the nested object in sequence, from the root of the object and down through the hierarchy. On a given level of the hierarchy, the scan may proceed in any consistent direction, e.g. from left to right or from right to left. However, to improve efficiency backtracking—re-reading sub-objects that have already been read—is to be avoided.

As the scan proceeds, names in the object may be atomized, as depicted by block 704. The atomization may involve identifying an integer value not assigned to any other name, and associated the name with the integer value. A map storing associations between numeric identifiers and the names may be constructed as the scan proceeds, and stored in a header of the on-disk version of the object once the scan is complete. In some instances, the numeric identifier may also map to a type identifier that is indicative of the type of the value that the atomized name is associated with.

Block 706 depicts writing data indicative of the object onto a storage device. The writing may be performed in synchrony with the scan of the in-memory version of the object, meaning that the scan of the in-memory version of the object may proceed in conjunction with writing the object to disk. For example, as the scan progresses portions of the on-disk format of the nested object are written to disk. The numeric identifiers are written in place of names, where applicable. Note that in some cases, not all names may have map entries. This may be the case because a name is deemed too short to be worth atomizing, or it may be the case when space in the map has become full.

For scalar values, as indicated by block 708, length indicators may be written as a prefix prior to a representation of the scalar value itself. For example, as depicted in FIG. 4, the length field 402 may be written in a lower portion of memory than the scalar value field 404, allowing the length field to be read from memory, at a later time, prior to processing the bytes of the scalar value field 404. This approach may allow loading or processing of the scalar value field to be skipped.

For collections of values such as arrays, lists, maps, and sets, a count field may be written to the storage device in lieu of, or in addition to, a length indicator. Block 710 depicts writing count indicators as a prefix to collections of values. The length indicator, if present, may be useful in subsequent read operations but may not be available without at least a second scan of the collection of values. FIG. 5 depicts an example of a count field, depicted as an list count field 502.

Figure 8:
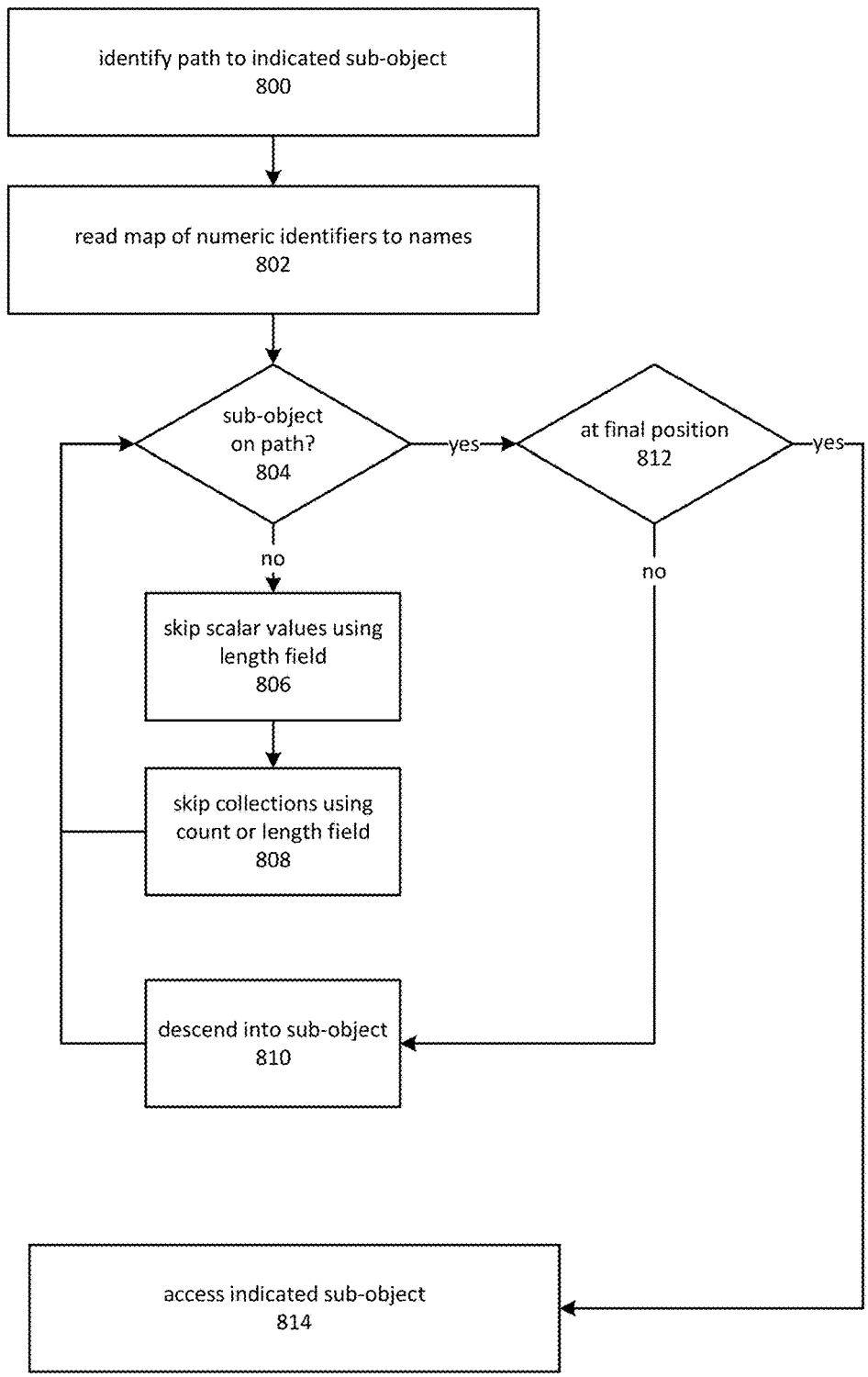
FIG. 8 is a flow diagram depicting retrieval of a portion of an object.

FIG. 8 is a flow diagram depicting retrieval of a portion of an object. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 800 shows that accessing a portion of a nested object may including identifying a path to the indicated sub-object. For example, with reference to FIG. 3, a path "A.B.D" might be supplied in a request to access a portion of an object.

Next, block 802 depicts reading a map containing associations between numeric identifiers and corresponding names. The map may be located in a header portion of an on-disk representation of the object. As shown in FIG. 6, a map 600 may associate numeric identifiers 602-604 with corresponding names 610-612. The association may be used to determine numeric identifiers for the sub-objects on the supplied path. In one example, the path might be "A.B.D."

Access to the desired sub-object may proceed by scanning the on-disk representation of the object and locating sub-objects that correspond to the path. Block 804 depicts determining if the current position of the scan is at a sub-object that is on the path of the desired object. If it is not, the operations depicted by blocks 806 and 808 may be performed. If it is, it may be determined that the current position is the final position at block 812. If so, the sub-object indicated by the path may be accessed, as depicted by block 814. If not, the operation depicted by block 810 may be performed. This operation may involve descending into the current object in order to process its contents and locate the next sub-object on the path.

Block 806 depicts advancing over scalar values by using the length field to skip over the bytes in which the scalar object is stored. Similarly, block 808 depicts skipping collections of values, such as arrays, lists, maps, and sets, using a count field or, if one is available, a length field. After advancing over each field, the identifier of the next sub-object may be examined to determine if it is on the requested path. If not, the sub-object can be skipped using the operations of blocks 806 and 808. If the next sub-object is on the path, it can be descended into at depicted by block 810. Descending into a sub-object may comprise examining its sub-sub-objects, i.e. the sub-objects it contains.

In an example embodiment, a system for storing nested object comprises a storage device and a computing node that is in communication with the storage device. The computing node can receive data describing a request to store a nested object. The nested object may be described as comprising a hierarchy of sub-objects. For the example, it may be presumed that the nested object contains a first sub-object that is associated with a first name, and a second sub-object that is a child of the first sub-object. In other words, the first sub-object contains the second sub-object. The second sub-object may be associated with a second name. The second object, for the purposes of this example, may comprise an list, array, or other collection of additional sub-objects. The additional sub-objects may be scalar values, collections of values, or other types.

To store the nested object, a storage engine or other component of the database may begin to scan the object while it resides in memory. The storage engine may form a map that comprises a first numeric identifier that has been assigned as an identifier of the first name of the first sub-object. The storage engine may similarly add a second association, between a second identifier and the second sub-object, to the map. The storage engine may continue to assign numeric identifiers to names as the nested object is scanned.

The storage engine may then store a representation of the object in a memory of the storage device. In other words, the storage engine may write the representation onto the storage device. The representation may comprise the map, the first numeric identifier, a first field indicative of a size of the first scalar value followed in the memory of the storage device by the first scalar value, and a second field indicative of a number of entries in the list followed in the memory of the storage device by representations of the plurality of additional sub-objects. These arrangements are depicted, for example, in the scalar value encoding 400 of FIG. 4 and the list encoding 500 of FIG. 5.

In response to a request to access the list portion of the second sub-object, the storage engine may calculate a position of the list in the memory of the storage device based at least in part on the first field, which is indicative of the size of the first scalar value. For example, the size of the first scalar value may be used to skip over the representation of the scalar value an on to the location in memory where the list is located. In some instances, therefore, the position of the list portion of the second sub-object may be calculated by determining the location of the first scalar value in the object and adding an offset corresponding to the size of the first scalar value.

Additional sub-objects, stored subsequent to the list in the memory of the storage device, may be accessed by at least calculating a position of the additional sub-object in the memory of the storage device using the second field, which is indicative of the number of entries in the list, and on size indicators prefixed to sub-objects in the plurality of additional sub-objects. For example, the list may be traversed by reading a value indicating how many entries there are in the list, and then using size indicators prefixed to the individual elements to skip over each element of the list, until they have all been skipped. The additional sub-object, in this example, may be presumed to follow the list and may therefore be accessed once the on-disk portion of the second sub-object has been read. Accordingly, in some instances the portion of a sub-object that is subsequent to a collection, such as a list, may be calculated by determining the starting position of the collection and keeping a running total of the size of the individual elements of the collection. The position of the sub-object subsequent to the collection may also be adjusted to reflect the memory space occupied by any additional information, such as a count field. Note that in some cases, the size information for a collection may contain a previously calculated value indicative of the size of the collection, which may be added to the starting position of the collection in order to locate the position of the portion of the sub-object that is subsequent to the collection.

Figure 9:
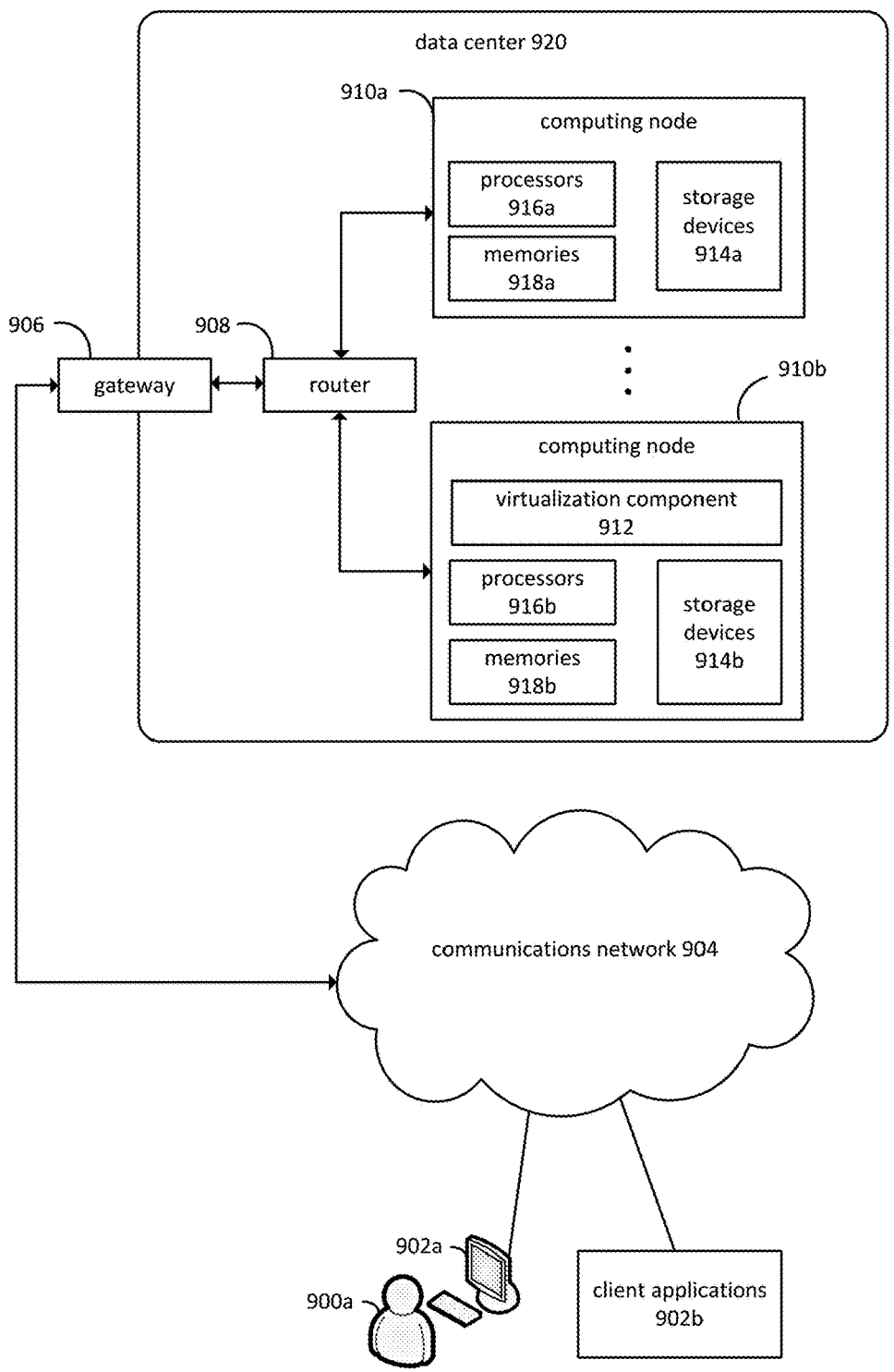
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900*a* may interact with various client applications, operating on any type of computing device 902*a*, to communicate over communications network 904 with processes executing on various computing nodes 910*a* and 910*b* within a data center 920. Alternatively, client applications 902*b* may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a and 910b may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910a and 910b. Some of these intermediate layers may themselves comprise processes executing on one or more of the computing nodes. Computing nodes 910a and 910b, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916a, one or more memories 918a, and one or more storage devices 914a. Processes on computing node 910a may execute in conjunction with an operating system or alternatively may execute as a bare-metal process that directly interacts with physical resources, such as processors 916a, memories 918a, or storage devices 914a.

Computing node 910b may comprise a virtualization component 912, which may include a virtual machine host and virtual machine instances to provide shared access to various physical resources, such as physical processors, memory, and storage devices. These resources may include the depicted processors 916b, memories 918b, and storage devices 914b. Any number of virtualization mechanisms might be employed to provide shared access to the physical resources.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented without the use of virtualization, computing nodes may include one or more memories configured to store computer-readable instructions and one or more processors configured to read and execute the instructions. A computing node may also comprise one or more storage devices, network interfaces, communications buses, user interface devices, and so forth. Computing nodes may also utilize virtualized computing resources, such as virtual machines implemented with or without a hypervisor, virtualized bare-metal environments, and so forth. A virtualization-based computing node therefore encompasses both the virtualization resources and the physical hardware needed to execute the virtualization resources. A computing node may be configured to execute an operating system and application programs. In some embodiments, a computing node might also comprise bare-metal application programs.

Figure 10:
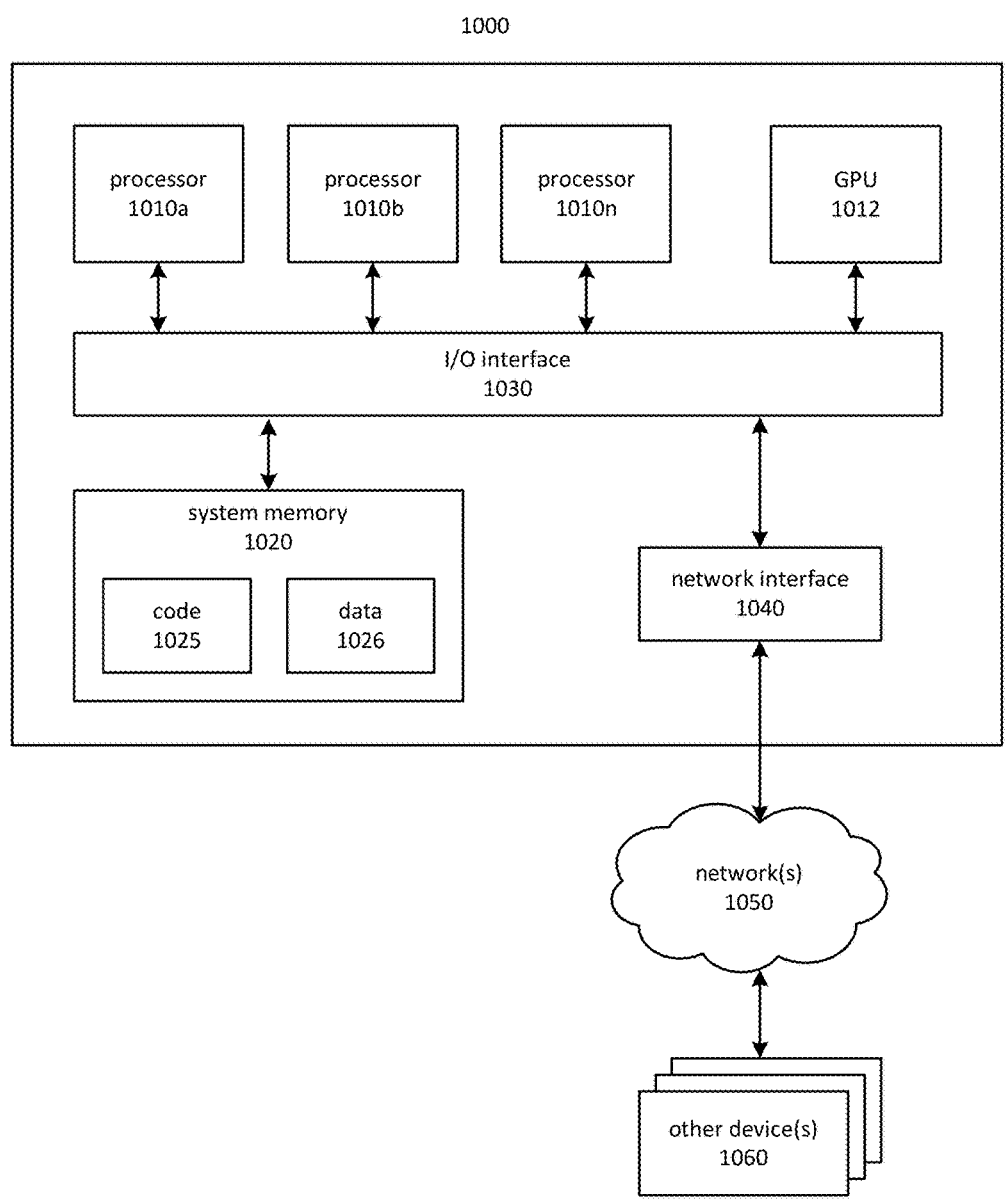
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device. In some instances, the GPU 1012 may perform calculations and execute instructions in cooperation with or in place of the processor 1010. Accordingly, as used herein, the term processor may encompass a GPU. Similarly, other highly parallelized processor architectures that supplement or replace the operation of the primary processor 1010 are also encompassed by the term processor.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The computing device 1000 may be configured by software instructions to contain a module (not shown). A module is a component of the computing device 1000 that includes a set of instructions, loaded in whole or in part into system memory 1020, for performing a set of related functions, including input and output with other modules. The code 1025 and data 1026 of system memory 1020 are altered by the loading of the instructions. The operation of a module is effected by interchange between processor 1010, or in a multiprocessor system 1010*a*-1010*n* and/or GPU 1012, and the system memory 1020 via I/O interface 1030. A module may interact with other modules of the computing device 1000 via system memory 1020, and with other devices 1060 via network interface 1040 and network 1050.

A compute node, which may be referred to also as a computing node, may be implemented on a wide variety of computing environments, such as tablet computers, personal computers, smartphones, game consoles, commodity-hardware computers, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, instructions executed by one or more computers or computer processors. The instructions may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software instructions and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the instructions, systems, and data structures may also be stored (e.g., as software instructions or structured data) on a computer-readable medium, such as a hard disk, a memory, a network, or a portable media article to be read by an appropriate device or via an appropriate connection. The instructions, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for storing hierarchical objects, the system comprising:
    a storage device; and a computing node in communication with the storage device, wherein the computing node at least:
receives a request to store an object, the object comprising a hierarchy of sub-objects including a first sub-object associated with a first name, and a second sub-object associated with a second name, the first sub-object comprising a first scalar value and the second sub-object comprising a list of a plurality of additional sub-objects;
forms a map comprising a first numeric identifier formed to represent the first name of the first sub-object and a second numeric identifier formed to represent the second name of the second sub-object;
stores a representation of the object on the storage device, the representation comprising the map, a second instance of the first numeric identifier in place of the first name, a first field indicative of a size of the first scalar value followed on the storage device by the first scalar value, and a second field indicative of a number of entries in the list followed on the storage device by representations of the plurality of additional sub-objects;
retrieves the second sub-object from the storage device, by at least locating the second sub-object in the storage device based at least in part on the first field indicative of the size of the first scalar value of the first sub-object; and
retrieves a third sub-object stored subsequent to the second sub-object on the storage device, by at least locating an end of the second sub-object on the storage device based at least in part on the second field indicative of the number of entries in the list.

2. The system of claim 1, wherein each representation of a scalar value in the plurality of additional sub-objects is prefixed with a size indication.

3. The system of claim 1, wherein the hierarchy of sub-objects is traversed no more than twice in response to the request to store the object.

4. The system of claim 1, wherein the computing node at least:
determines a value indicative of a size of the object as received in the request to store an object; and
stores the value indicative of the size of the object in the representation of the object.

5. The system of claim 1, wherein the computing node at least:
accesses the third sub-object by deserializing sub-objects on a path from a root of the hierarchy of sub-objects to the third sub-object.

6. A method for storing hierarchical objects on a storage device, the method comprising:
receiving information indicative of storing, on the storage device, an object comprising a hierarchy of sub-objects including a first sub-object and a second sub-object, the first sub-object comprising a first scalar value and the second sub-object, the second sub-object comprising a collection of additional sub-objects;
storing a map comprising a first numeric identifier indicative of a first name of the first sub-object of the hierarchy of sub-objects and a second numeric identifier indicative of a second name of the second sub-object of the hierarchy of sub-objects;
storing, on the storage device, a second instance of the first numeric identifier in place of the first name, a first field indicative of a size of the first scalar value followed by the first scalar value, and a second field indicative of a number of entries in the collection followed by representations of the additional sub-objects;
locating the second sub-object on the storage device, based at least in part on the first field indicative of the size of the first scalar value; and
accessing a third sub-object stored subsequent to the second sub-object on the storage device by at least locating an end of the second sub-object, the locating based at least in part on the second field indicative of the number of entries in the collection.

7. The method of claim 6, further comprising:
storing the size of the first scalar value in at least one of a one, two, or three byte format.

8. The method of claim 6, wherein the collection is one of an array, map, list, or set.

9. The method of claim 6, wherein each representation of a scalar value in the collection of additional sub-objects is prefixed with a size indication.

10. The method of claim 6, wherein the hierarchy of sub-objects is traversed no more than twice in response to receiving the information indicative of storing.

11. The method of claim 6, further comprising:
storing information indicative of the size of the object as provided in a request to store the object, the size of the object as provided in the request being less than the size of the representation of the object on the storage device; and
calculating a cost of accessing the object based at least in part on the size of the object as provided in the request.

12. The method of claim 6, further comprising:
accessing the third sub-object by deserializing sub-objects on a path from a root of the hierarchy of sub-objects to the third sub-object and skipping over sub-object not on the path.

13. The method of claim 6, further comprising:
prefixing the collection with the second field and a third field indicative of a size of the collection.

14. The method of claim 6, further comprising:
reserving a fixed amount of space on the storage device for the map; and
storing the map on the storage device subsequent to storing the first sub-object, the second sub-object, and the additional sub-object.

15. A non-transitory computer-readable storage medium having stored thereon instructions that, upon execution by a computing device, causes the computing device at least to:
receive information indicative of storing, on a storage device, an object comprising a hierarchy of sub-objects including a first sub-object and a second sub-object, the first sub-object comprising a first scalar value and the second sub-object, the second sub-object comprising a collection of additional sub-objects;
store a map comprising a first numeric identifier indicative of a first name of the first sub-object of the hierarchy of sub-objects and a second numeric identifier indicative of a second name of the second sub-object of the hierarchy of sub-objects;
store, on the storage device, a second instance of the first numeric identifier in place of the first name, a first field indicative of a size of the first scalar value followed by the first scalar value, and a second field indicative of a number of entries in the collection followed by representations of the additional sub-objects;
locate the second sub-object on the storage device, based at least in part on the first field indicative of the size of the first scalar value; and access a third sub-object stored subsequent to the second sub-object on the storage device by at least locating an end of the second sub-object, the locating based at least in part on the second field indicative of the number of entries in the collection.

16. The non-transitory computer-readable storage medium of claim 15, wherein the hierarchy of sub-objects is traversed no more than twice in response to receiving the information indicative of storing.

17. The non-transitory computer-readable storage medium of claim 15, comprising further instructions that, upon execution by the computing device, cause the computing device to at least:

form the map during a first scan of the object.

18. The non-transitory computer-readable storage medium of claim 15, wherein each representation of a scalar value in the collection of additional sub-objects is prefixed with a size indication.

19. The non-transitory computer-readable storage medium of claim 15, comprising further instructions that, upon execution by the computing device, cause the computing device to at least:

store information indicative of the size of the object as provided in a request to store the object, the size of the object as provided in the request being less than the size of the representation of the object on the storage device; and calculate a cost of accessing the object based at least in part on the size of the object as provided in the request.

20. The non-transitory computer-readable storage medium of claim 15, comprising further instructions that, upon execution by the computing device, cause the computing device to at least:

reserve a fixed amount of space on the storage device for the map; and store the map on the storage device subsequent to storing the first sub-object, the second sub-object, and the additional sub-object.

\* \* \* \* \*